United States Patent Office 2,761,576
Patented Sept. 4, 1956

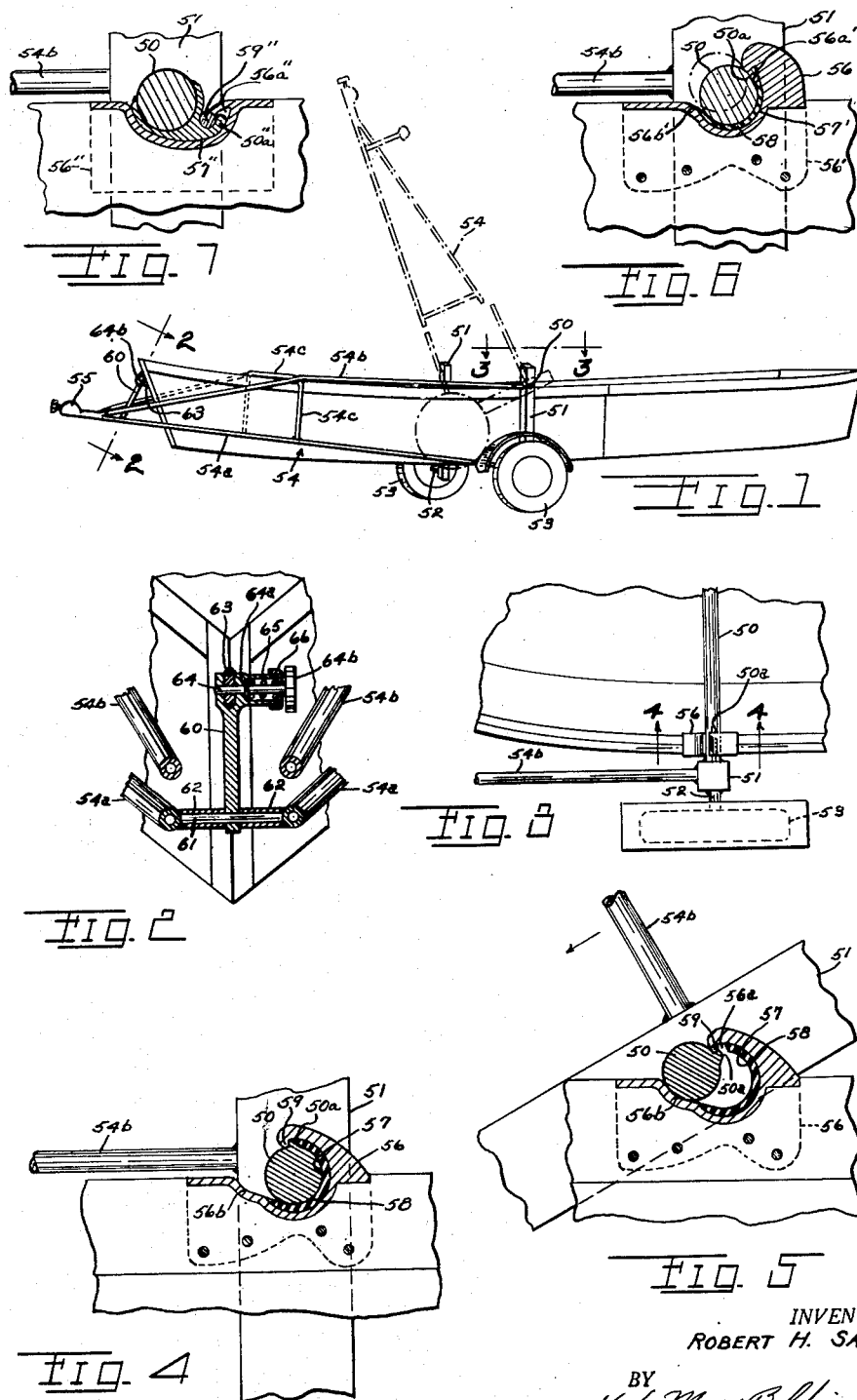

2,761,576

BOAT TRAILER

Robert H. Sanborn, Collegedale, Tenn.

Application September 3, 1953, Serial No. 378,319

9 Claims. (Cl. 214—373)

This invention relates to improvements in a trailer and more particularly to a trailer especially adapted to transport an elongated body such as a boat.

This application is a continuation-in-part of my co-pending U. S. patent application, Serial Number 43,670, filed August 11, 1948, and now Patent No. 2,664,577 and entitled "Trailer."

One of the objects of the present invention is to provide a trailer comprising very simple frame parts adapted to be attached to a boat and so constructed and arranged that it is simple and easy to manufacture and yet efficient in its operation. Another attribute of my trailer is that it is readily attached and detached from the boat.

Still another object of the invention is to provide novel means for bracing the wheel supporting strut when it is in position for transporting a boat along the highway together with novel means for swinging the wheel and its supporting strut out of the way when the boat is afloat.

Another object of the invention is to provide a wheeled truck straddling the boat and rigidly connected with a V-shaped draw bar extending forwardly to a point ahead of the prow of the boat. By pivotally mounting this truck to the gunwales of the boat, the draw bar provides a lever for oscillating the truck about the pivotal mounting to move the wheels into and out of boat supporting position.

Still another object of the invention is to provide in the combination of the preceding paragraph, a quick detachable pivotal coupling between the truck which straddles the boat and the gunwales of the boat. A preferred form of this device provides a radial projection on the crossbar of the truck and sockets or recesses in brackets mounted on the boat adapted to receive and hold the crossbar when the truck is in boat transporting position but allowing the crossbar to be rolled out of the recesses when it is desired to place the boat upon the ground.

Other objects and advantages of my invention will be apparent from the accompanying drawings and description and the essential features will be set forth in the appended claims.

In the drawings,

Fig. 1 is a perspective view of my carrying trailer having a V-shaped frame extending to a point in front of the prow of the boat to provide a draw bar. The dot-dash lines show a second position of the draw bar and wheeled truck;

Figs. 2 and 3 are fragmental views enlarged taken along similarly numbered lines of Fig. 1;

Fig. 4 is a fragmental sectional view further enlarged taken along the line 4—4 of Fig. 3 and showing the boat-supporting position of the parts;

Fig. 5 is similar to Fig. 4 but showing another position of the parts;

Fig. 6 is a modified form of attachment between the boat and trailer in a boat-supporting position corresponding to Fig. 4; while Fig. 7 is another modified form of attachment between the boat and trailer in a boat-supporting position corresponding to Fig. 4.

I have shown in Figs. 1 to 7 inclusive a very light and simple frame for providing a trailer for transporting a boat or the like along the highway. The trailer carrier or truck comprises a cylindrical crossbar 50 extending across the top of the boat at its midportion and laterally beyond the gunwales. At each end of this crossbar and rigidly connected therewith is a downwardly extending strut 51. At the lower end of each strut is a stub shaft 52 on which is rotatably mounted a wheel 53. Extending forwardly from the truck is a V-shaped frame 54 extending forwardly to a point 55 ahead of the prow of the boat and there provided with a drawbar hitch for attachment to a tractor. Each of the side arms of the frame comprises a lower member 54a and an upper member 54b roughly parallel to the sides of the boat and rigidly connected at their rearward ends to the associated strut 51. A bracing member 54c extends from the side arm 54a on one side of the boat upwardly and connected rigidly to the side arm 54b then across the top of the boat and there connected to the side arm 54b and 54a on the opposite side. This makes a very strong frame.

Means is provided for pivotally mounting the crossbar 50 on the gunwales of the boat so that the truck may be rotated about this pivotal mounting either to raise the boat into and hold it in the solid line, boat-transporting position of Fig. 1 or to lower the boat off the trailer carrier or truck. In the present case, a quick detachable mounting is provided as clearly shown in Figs. 3, 4 and 5. A bracket 56 is screwed or bolted on each of the gunwales of the boat and each bracket has a C-shape recess 57 adapted to receive the cylindrical crossbar 50. In order to eliminate rattle while the boat is being transported I preferably line each recess with a layer of rubber-like material 58 bonded to the metal of the bracket. This rubber-like lining may be used, if desired, but is not essential. In order to achieve certain advantages I provide a radially extending projection 50a at each end of the crossbar 50 and I provide a detent 56a at the top of the recess 57.

It will now be evident from a study of Figs. 1, 4 and 5 that with the parts in full line position of Figs. 1 and 4, the wheels 53 will rest upon the ground and the boat will be raised above the ground so as to be transported in this boat supporting position. When the frame 54 is moved to the dot-dash position of Fig. 1, then the parts are in the positon of Fig. 5 and the crossbar 50 may be slid slightly forwardly and upwardly out of the recesses 57 in each of the brackets 56 so as to separate the frame and the truck from the boat itself and to leave the boat sitting upon the ground.

In the reverse of the above operation the boat resting upon the ground has the truck run over it to a central position where the projection 50a at opposite bar ends may be slid under the associated nose 59 of the side bracket to engage in the detent 56a while the bottom of crossbar 50 rests in an arcuate depression 56b facing said detent 56a at the mouth of recess 57. Then, the frame 54 may be oscillated in the direction of the arrow of Fig. 5 which will cause the crossbar 50 to roll from depression 56b into recess 57 to reach the boat-supporting position in Fig. 4 and in the solid line position of Fig. 1. It should be noted that the pivotal mounting of crossbar 50 is located approximately in vertical alignment with the center of gravity of said boat and the wheels 53 are located approximately below crossbar 50 in the solid line Fig. 1 position so that the full boat weight will be easily lifted up into said boat-supporting position by the large mechanical advantage of the lever system. Also, this action will lift the whole boat weight and not merely one end of the boat.

Fig. 6 illustrates a modified form wherein bracket 56 is replaced by a similarly located bracket 56' having a flat 56b' instead of depression 56b and having a detent 56a' in a slightly different location than detent 56a but with the remaining parts basically the same. The boat lowering, raising and towing operations are generally the same. However, after the projection 50a at each end of crossbar 50 is slid under its associated nose 59 into detent 56a and the crossbar is in the dot-dash line position of Fig. 6, the trailer is oscillated to swing the bottom of the crossbar counterclockwise and simultaneously to raise the boat into the boat-supporting and towing position shown in solid lines in Fig. 6. Flat 56b' provides adequate swing clearance since it extends approximately at right angles to the lower end of a diameter of said crossbar 50 extending through the crossbar projection 50a (when crossbar 50 is in the solid line, boat-supporting position of Fig. 6). Hence, flat 56b' extends tangentially to the swing arc followed by the periphery of crossbar 50 when captured projection 50a serves as the pivot point in raising and lowering the boat.

In the Fig. 7 modification, means is also provided for pivotally mounting the crossbar 50 on the gunwales of the boat so that the truck may be rotated about this pivotal mounting either to raise the boat into and hold it in the solid line, boat-transporting position of Fig. 7 or to lower the boat off the trailer carrier or truck. In the present case, a quick detachable mounting is provided as clearly shown in Fig. 7. A bracket 56'' is screwed or bolted on each of the gunwales of the boat and each bracket has a recess 57'' adapted to receive the cylindrical crossbar 50. Each bracket 56'' corresponds in type and location to bracket 56. In order to achieve certain advantages I provide a bracket on each end of the crossbar 50 having a radially extending projection portion 50a'' of hook-shape and I provide a detent portion 56a'' at the top of the recess 57''. The detent portion 56a'' is formed by a pin 59'' welded or otherwise secured to the remainder of the bracket 56'' with this pin forming a nose on the bracket. This detent portion 56a'' is complementary to the hook-shape projection portion 50a'' so that the boat owner may use the portions 50a'' and 56a'' in raising said boat to, holding said boat in, or lowering the boat from said supporting position. The pin 59'' provides a positive pull connection when transporting the boat and hook-shape portion 50a'' carries the boat and provides the locking action. Either or both portions 50a'' or 56a'' may be of hook-shape in the Fig. 7 modification, while only detents 56a and 56a' in Figs. 5 and 6 are hook-shape portions.

The boat lowering, raising and towing operations in Fig. 7 are generally the same as before. After the projection 50a'' at each end of crossbar 50 is slid under its associated nose 59'' into detent 56a'', the trailer is oscillated to swing the bottom of the crossbar counterclockwise and simultaneously to raise the boat into the boat-supporting and towing position shown in solid lines in Fig. 7.

In order to hold the truck in boat transporting position I provide novel means at the prow end of the boat as clearly shown in Figs. 1 and 2. This comprises a link 60 pivotally mounted on a pin 61 which in turn is rigidly secured to the arm members 54a on each side of the boat. Spacer sleeves 62 hold the link 60 in central position. The upper end of the link is connected with a bracket 63 fastened to and below the prow of the boat by means of a pin 64 which is normally urged toward locking position by a helical spring 65 which is held between a cap 66 surrounding the pin and a collar 64a on the pin. A knob 64b serves for manipulation of the pin when it is to be disconnected. It should be obvious from a study of Fig. 1 that with the link 60 in its locked position the frame 54 and the truck 50—51—52—53 cannot move out of its boat-transporting position.

When it is desired to lower the boat to the ground, then the link 60 is disconnected and the frame is moved in a clockwise direction from the full line position of Fig. 1 to the dot-dash line thereof.

It results from the above construction that I have provided a light weight trailer consisting of a very few parts and cheaply and easily constructed. The boat is easily attached to or detached from this trailer. The boat may be launched easily by detaching the trailer from the tractor vehicle and rolling the boat on the wheels 53 into the water after which the wheels may be moved to the dot-dash position of Fig. 1.

Various changes in details and arrangement of parts can be made by one skilled in the art without departing from the spirit of this invention or the scope of the appended claims.

What I claim is:

1. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck including a single crossbar extending across the top of said boat, a fitting at each gunwale of the boat providing a recess for said crossbar, a radial projection on said crossbar at each recess, and a detent connected with said recess for holding said projection with said crossbar in the associated recess only when said wheels are in boat-transporting position.

2. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a cylindrical crossbar extending across the top of said boat, a fitting at each gunwale of the boat providing a generally C-shaped recess for said crossbar, a radial projection on said crossbar at each recess, each recess having adjacent one end a detent therein for coaction with said projection to raise to and hold said boat in or lower said boat from said supporting position, the surface of said recess at the mouth of said C-shape opposite said detent being generally flat and extending approximately at right angles to the crossbar diameter through said projection when the crossbar is in said recess.

3. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a cylindrical crossbar extending across the top of said boat, a fitting at each gunwale of the boat providing a generally C-shaped recess for said crossbar, a radial projection on said crossbar at each recess, each recess having adjacent one end a detent therein for coaction with said projection to raise to and hold said boat in or lower said boat from said supporting position, the surface of said recess at the mouth of said C-shape opposite said detent having an arcuate depression facing said detent.

4. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a crossbar extending across the top of said boat, a fitting at each gunwale of the boat providing a recess for said crossbar, a radial projection portion on said crossbar at each recess, each recess having adjacent one end a detent portion therein, at each fitting one of said portions being hook-shape and the other portion being complementary thereto, whereby the coaction of said portions raise said boat to and hold said boat in or lower said boat from said supporting position.

5. The combination of claim 4, wherein said radial projection portion on said crossbar has said hook-shape.

6. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck including a single crossbar element extending across the top of said boat, a fitting at each gunwale of the boat providing a recess element for said crossbar element, a radial projection on one of said elements at each recess, and a detent on the other of said elements for cooperating with said projection for holding said crossbar in the associated recess only when said wheels are in boat-transporting position.

7. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a cylindrical crossbar element extending across the top of said boat, a fitting at each gunwale of the boat providing a generally C-shape recess element for said crossbar element, a radial projection portion on one of said elements at each recess, the other of said elements having a detent portion therein for coaction with said projection to raise to and hold said boat in or lower said boat from said supporting position, the surface of said recess at the mouth of said C-shape opposite its associated portion being generally flat and extending approximately at right angles to the crossbar element diameter through its associated portion when the crossbar element is in said recess.

8. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a cylindrical crossbar element extending across the top of said boat, a fitting at each gunwale of the boat providing a generally C-shaped recess for said crossbar element, a radial projection portion on one of said elements at each recess, the other of said elements having a detent portion therein for coaction with said projection portion to raise to and hold said boat in or lower said boat from said supporting position, the surface of said recess at the mouth of said C-shape opposite its associated portion having an arcuate depression facing said last-mentioned portion.

9. Means for transporting a boat including a wheeled truck straddling the boat, a pivotal mounting for said truck on said boat near the upper portion of said boat, and a draw bar rigid with said truck and extending forwardly from said truck for attachment to a tractor vehicle, whereby said draw bar provides a lever for oscillating said truck about said pivotal mounting when mooring said wheels into and out of boat-supporting position, said truck and its pivotal mounting including a crossbar element extending across the top of said boat, a fitting at each gunwale of the boat providing a recess element for said crossbar element, at each fitting a hook-shape projection portion on one of said elements and a detent portion on the other of said elements complementary thereto, whereby the coaction of said portions raise said boat to and hold said boat in or lower said boat from said supporting position.

References Cited in the file of this patent

UNITED STATES PATENTS

| | | |
|---|---|---|
| 2,451,236 | Oeth | Oct. 12, 1948 |
| 2,634,010 | Sass | Apr. 7, 1953 |